UNITED STATES PATENT OFFICE.

ARTHUR RICHARD SCARLETT, OF SHIRLEY, SOUTHAMPTON, ENGLAND.

CEMENT.

1,359,434.

Specification of Letters Patent. Patented Nov. 16, 1920.

No Drawing. Application filed December 16, 1919. Serial No. 345,306.

*To all whom it may concern:*

Be it known that I, ARTHUR RICHARD SCARLETT, a subject of the King of England, residing at Shirley, Southampton, in the county of Hants, England, have invented certain new and useful Improvements in Cement; and I do hereby declare the following to be a full, clear, and exact description of the invention, such as will enable others skilled in the art to which it appertains to make and use the same.

My invention relates to cement, well adapted to unite bodies, and particularly to secure and hermetically seal the stoppers or lids of bottles, jars, cans and the like.

According to my said invention, I use for the composition of my improved cement, the following ingredients, commonly known in commerce as Swedish pitch, rosin or colophony, cotton seed oil, or other oil or fat which will suitably amalgamate with the other ingredients; paper-pulp, paper, felt, hair or other suitable substance which will serve as a filler; and finally calcic-hydrate.

In making my improved cement, I prepare the aforesaid ingredients in the following manner:—The pitch and rosin are each separately heated until liquefied and then strained. The paper-pulp or its equivalent is finely disintegrated. The calcic-hydrate, when incorporated with the aforesaid ingredients in manner hereinafter described, should be in a freshly prepared finely divided, dry, warm and caustic condition.

Of the ingredients prepared as aforesaid, I take the following proportions by weight, namely, Swedish pitch 50 parts; rosin or colophony 24.5 parts; cotton-seed oil or its equivalent 9.5 parts; paper-pulp or its equivalent 14.0 parts; calcic hydrate 2.0 parts.

The Swedish pitch and rosin are re-liquefied by moderate heat and well mixed, and the oil added, and to the resultant liquid while hot and well stirred, the calcic hydrate is added through the meshes of a fine sieve, with this hot mixture the paper pulp or its equivalent made warm and dry for the purpose, is incorporated.

The mass, now brought to a temperature of about 200° Fahrenheit, is then well kneaded until of uniform consistency.

As the commercial quality of most of the said ingredients varies considerably, it is advisable in manufacture, to first make a small quantity of the cement for testing purposes, following upon which it may be found that a slight alteration in the quantity used of one or more of the ingredients is necessary to insure a cement possessing the properties hereinafter described.

A slight increase in the quantity added of the paper pulp, or of the calcic hydrate serves to reduce the viscosity of the cement, but as the finely divided caustic calcic-hydrate acts not only mechanically as a filler, but also chemically on the acid radicals of the pitch, rosin and oil; great care should be taken not to add an excess of this ingredient, as even a slight excess of calcic-hydrate serves to greatly impair the adhesive and cohesive properties of the cement when hot. Used in the proportions given, or nearly so, the calcic-hydrate makes the cement harder when hot, and also more resistant to the disintegrating action of heated vapors and liquids.

At a summer temperature of say 90 degrees Fahrenheit, my cement is plastic, pliable and non-adhesive; at lower temperatures it becomes harder and less plastic; at higher temperatures it becomes soft, viscid and consequently adhesive.

The cement will adhere to any surface to which it is applied, provided that the surface be dry and sufficiently warm to make the cement viscid; when cold the applied cement will be more or less firmly attached to the surface.

The cement will adhere more quickly if it is itself warm when applied, and if immediately after its application the outer surface of the cement be softened by a hot iron, but care should be taken not to oversoften or burn the cement with the hot iron. If desired the cooling and hardening of the cement, after it is applied, can be hastened by the application of cold water.

My improved cement is very useful for sealing a bottle or the like when the latter contains hot pasteurized fruit; such a receptacle covered with, say a glass cover, can be easily, expeditiously and hermetically sealed by placing a layer of the cement over the interstice between the cover and the bottle.

Hitherto the hermetic closing of receptacles, containing substances heated for pasteurization, has commonly been effected by using a mechanical arrangement to compress and maintain a rubber washer between the rim and the cover. This method of sealing is expensive, as it necessitates the employment of receptacles with mouths of standard shape, and fitments adapted to same. By the use of my cement the same is avoided and receptacles with mouths of almost any shape can be hermetically sealed with no other fitment than the cover.

Covers secured by my improved cement to bottles and the like, can be readily removed by warming the cement until it is soft enough to be cut with a knife or otherwise displaced.

Having thus described my invention what I claim and desire to secure by Letters Patent of the United States is:—

1. A cement comprising an intimate mixture of substantially 50 parts by weight of Swedish pitch, 24.5 of rosin, 9.5 parts of a vegetable oil, 14 parts of paper pulp, and 2 parts of calcic-hydrate.

2. A cement comprising an intimate mixture of substantially 50 parts by weight of Swedish pitch, 24.5 of rosin, 9.5 parts of cotton seed oil, 14 parts of paper pulp, and 2 parts of calcic-hydrate.

In testimony whereof I affix my signature.

ARTHUR RICHARD SCARLETT.